United States Patent [19]

Justice

[11] 3,845,498

[45] Oct. 29, 1974

[54] RECEIVER FOR AN EDUCATIONAL BRANCHING SYSTEM

[75] Inventor: James W. H. Justice, Murrysville, Pa.

[73] Assignee: Westinghouse Electric Corporation, Pittsburgh, Pa.

[22] Filed: May 25, 1973

[21] Appl. No.: 364,165

[52] U.S. Cl. ............................ 358/11, 178/DIG. 23

[51] Int. Cl. ............................................. H04n 9/02

[58] Field of Search....... 178/DIG. 23, DIG. 35, 5.6, 178/5.2 R, 5.4 R

[56] References Cited

UNITED STATES PATENTS

| | | | |
|---|---|---|---|
| 2,875,271 | 2/1959 | Moore et al. | 178/5.2 |
| 2,912,492 | 11/1959 | Haantjes | 178/5.2 |

*Primary Examiner*—Richard Murray
*Assistant Examiner*—R. John Godfrey
*Attorney, Agent, or Firm*—M. P. Lynch

[57] ABSTRACT

A closed circuit or conventional broadcast system used as an educational TV system features a multiplicity of pictures for branching purposes that are transmitted and received within a single TV frequency channel by modification to the encoder and decoder that are normally used for the transmission of NTSC color pictures. The receiver includes a coding and switching logic means to provide any one of three completely independent monochrome picture programs and conventional color television programs, all of which occupy a full TV raster. The changes to the encoding and decoding circuits avoid modification to the NTSC synchronizing waveforms and the relative positions of the video, audio and color subcarrier frequencies.

15 Claims, 9 Drawing Figures

FREQUENCY RESPONSE OF COMPOSITE SIGNAL

COMPOSITE VIDEO WAVEFORM (HORIZ. RATE)

PATENTED OCT 29 1974 SHEET 3 OF 5 3,845,498

RECEIVER FOR AN EDUCATIONAL BRANCHING SYSTEM

BACKGROUND OF THE INVENTION

TV systems for educational purposes have expanded usefulness by making available a multiplicity of video programs for branching purposes. This may include the provision of a number of TV programming sources for selection by a student while viewing the cathode-ray tube. Each programming should occupy a full TV raster in order to obtain maximum value and acceptance of the system. Such systems may supply, for example, a first program containing a question and then two other programs on other channels providing possible answers to the question. Audio instructions to the student must be included in the capability of the system. This is but one example of the use of a picture branching system in the field of educational television.

In both closed circuit and conventional broadcasting systems, it is highly objectionable to occupy a number of different channels for the program material. In the broadcasting case, not only are there a limited number of channels available, but the endless switch from channel to channel will produce excessive wear and premature failure of conventional tuner assemblies. In such systems a minimum of modifications to presently existing TV systems and equipment are essential factors to the system's expense. It is important that any modifications or changes do not involve changes in the NTSC synchronizing waveforms or the relative positions of video, audio and color subcarrier frequencies. The present invention employs a television transmitting and receiving system based on the principle used for the transmission of color broadcast according to the NTSC standards so that without modification to these standards, three concurrent and distinct programs can be broadcast within a single RF channel. This invention is based on the knowledge that when three independent monochrome pictures are concurrently converted into electrical signals and connected to the red, green and blue inputs of a standard encoder, the resulting modulated signal is a mixture of all camera inputs which cannot be separated from each other by a receiver. This is because the matrixing operations produce overlapping responses of the resulting Y, I and Q signals. Moreover, conventional color receivers lack switching capabilities to select one program from those supplied by different cameras.

SUMMARY OF THE INVENTION

In accordance with the present invention, an educational TV branching system is provided wherein in addition to transmitting and receiving color television programming in the conventional manner, there is provided the capacity to transmit and receive concurrently three independent monochrome pictures provided by separate TV cameras. The TV camera output signals are connected separately to the Y, I and Q inputs of a modified encoder. The independent concurrent signal inputs emerge from this encoder as a video signal and a modulated RF subcarrier signal that can be separated out by a modified decoder at the receiver to give the original independent video signals. Coding and switching logic circuitry in the receiver selectively allows one of the independent video signals to produce a picture utilizing the full TV raster on the cathode ray tube.

Specifically, the present invention provides in a TV transmitter switching means for excluding the matrixing circuitry, and frequency limiting means to limit the spectral responses of the video signals which correspond to Y, I and Q signals, so that the signals do not overlap, and means for synchronizing these signals in the encoder, modulating the subcarrier with information corresponding to the Q and I signals, and finally adding the Y signal to form a composite signal having the standard waveform and signal sequence.

The present invention further provides a receiver having a decoder for receiving in addition to a conventional color video signal, the aforesaid composite signal and producing three independent monochrome video signals corresponding to the three concurrent TV camera input signals. Frequency limiting means in the receiver maintain the spectral response of the monochrome signals. Coding and switching logic circuitry control the actual circuitry used to produce all video signals and select any one of them for display by a cathode ray tube.

These features and advantages of the present invention as well as others will be more fully understood when the following description is read in light of the accompanying drawings, in which.

Figure 1:
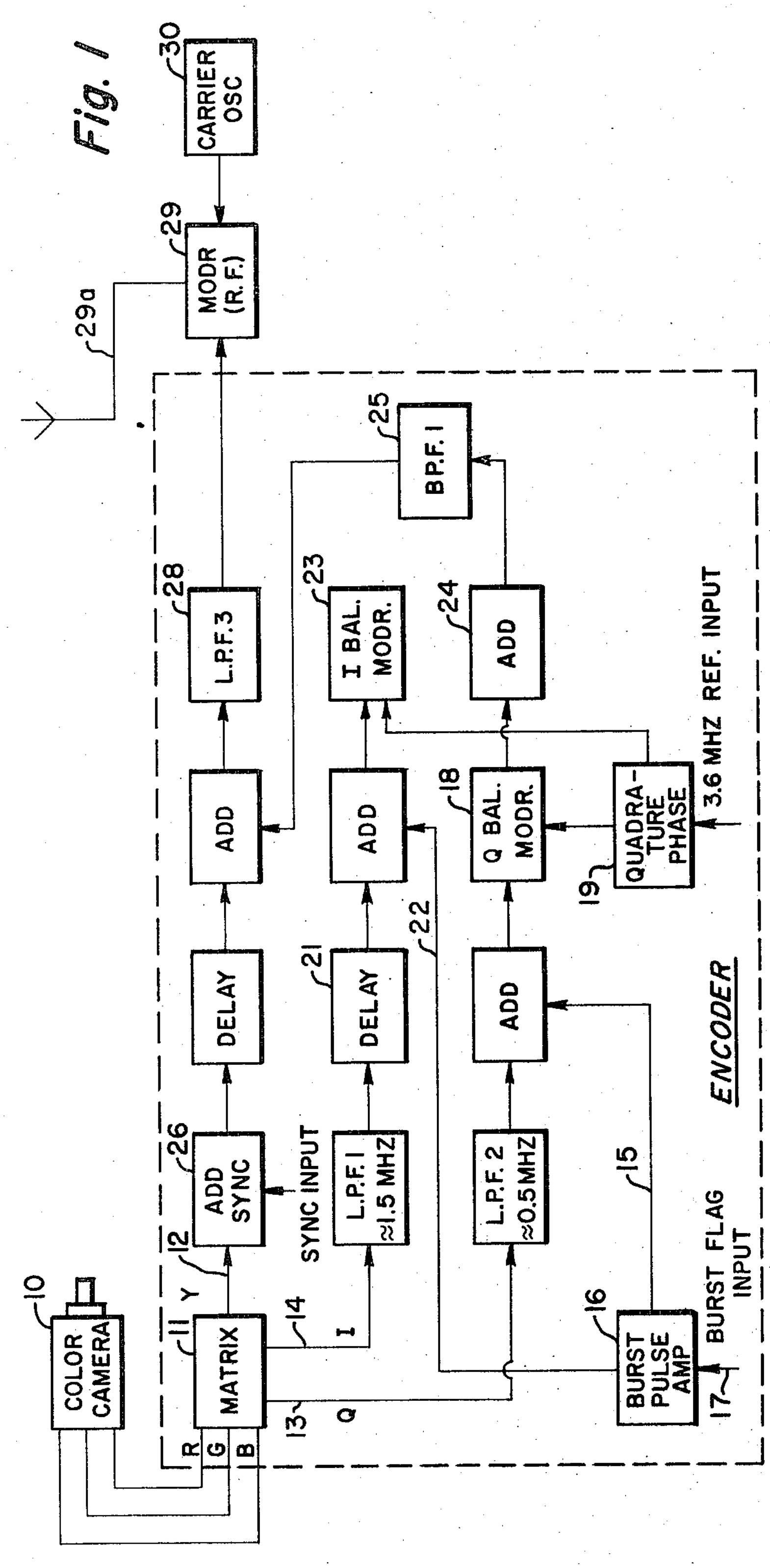
FIG. 1 illustrates a block diagram of typical encoder for transmitting a color composite video waveform according to NTSC standards.

With reference now to the drawings, and particularly to FIG. 1, a color television camera 10 is shown providing three video output signals conventionally referred to as R, G and B represented by the red, green and blue video signal components of a picture or scene. These signals are connected to the input terminals of a matrixing circuit 11 forming part of an encoder for combining the signals according to the waveform of the National Television System Committee (NTSC). The matrixing circuit produces a luminous signal Y in line 12 and chrominance signals Q and I in lines 13 and 14, respectively. The Q signal is bandwidth limited by a low-pass filter 15 selected at approximately 0.5 MHZ (megahertz). A burst pulse is then added to the Q signal during the time of the "back-porch" of the video signal by introducing a pulse in line 15 from burst pulse amplifier 16 which also receives a burst flag input along line 17. The Q signal is then fed into a Q modulator 18 which also receives a subcarrier signal from a quadrature phased circuit 19 having an input reference signal of approximately 3.6 MHZ.

The I video signal is delivered from the matrix circuitry 11 along line 14 through a low-pass filter selected at approximately 1.5 MHZ from where the signal passes into a delay circuitry 21 for synchronization with the Q signal due to the time lag produced by the unequal bandwidths of the low-pass filters in the Q and I circuits. The I signal is then added to a pulse signal transmitted along line 22 from the burst pulse amplifier 16. The I signal is then fed into an I signal modulator which also receives a subscarrier output signal from the quadrature phased circuit 19.

At this point in the description, particular attention is directed to the I balanced modulator which has two inputs. These inputs are a video signal and a subcarrier signal. The outputs of the I balanced modulator is in the form of an amplitude modulated carrier signal, the video and the carrier inputs being suppressed due to the balanced operations. The same operation occurs in the Q balanced modulator except that the phase of the input carrier signal is in quadrature with the carrier inputs to the I balanced modulator. As a result, two amplitude modulated carrier signals are obtained which have a quadrature phased relationship. These are added together by adder 24 to form a single carrier frequency signal whose amplitude and phase are a function of the relative proportions of the I and Q video signals. As will be discussed hereinafter, in the receiver, the I and Q video signals are regained in complete independence of each other by synchronously detecting them at the quadrature phase at approximately 3.6 MHZ carrier reference frequency, and by suitable bandwidth limits to these signals.

Figure 2:
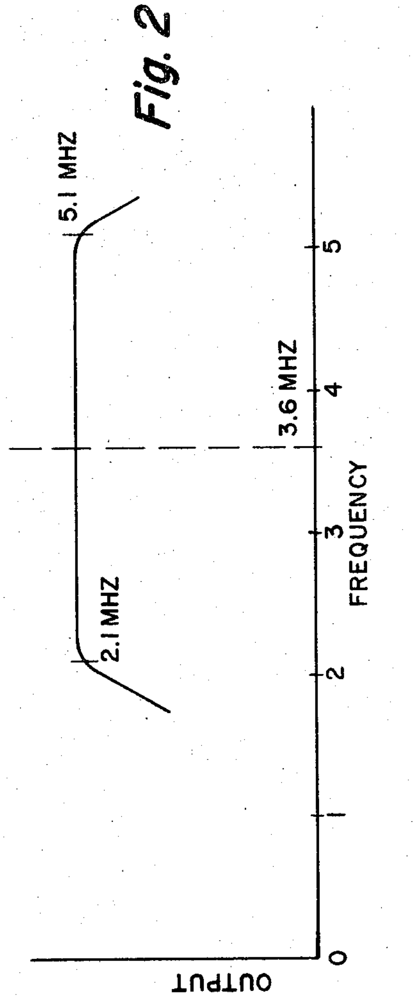
FIG. 2 illustrates the bandwidth frequency response of the modulated I and Q signals.
Figure 3:
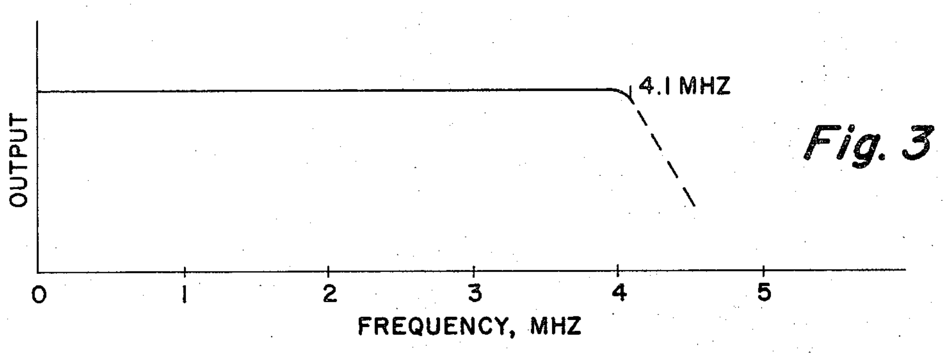
FIG. 3 illustrates the bandwidth frequency of the modulated Y, I and Q signals.
Figure 4:
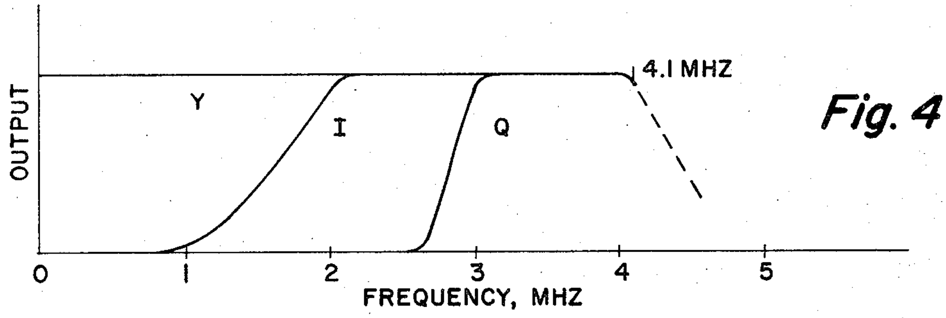
FIG. 4 illustrates the video spectral response of the composite Y, I and Q signals.
Figure 5:
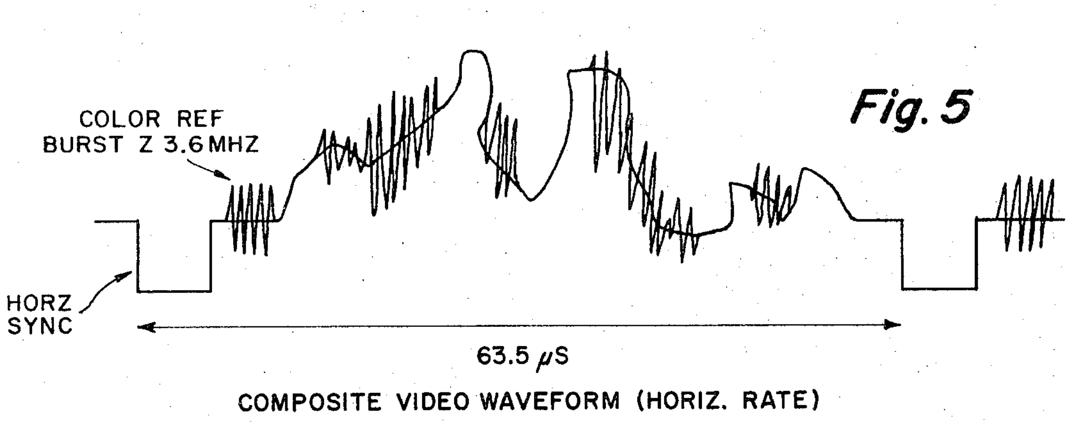
FIG. 5 illustrates the modulated composite video waveform, horizontal rate.

After the modulated I and Q signals are added, they are next bandwidth limited to the frequency range as shown in FIG. 2 by a bandpass filter 25. From the filter 25, the composite Q and I signals are added to the Y signal after it has passed through a sync pulse adder 26 and then through a delay circuit to equalize the delay of all three Y, Q and I signal paths. The composite signal of the Y, Q and I signals, is then bandwidth limited by filter 28 to conform to the NTSC specifications before being applied to a radio-frequency modulator 29. This modulator receives a signal from a carrier oscillator to produce the single radio frequency used for transmission by the antenna **29*a*. The video spectral response of the composite signals Y, Q and I, is shown in FIG. 4. The horizontal rate of the composite video waveform is shown in FIG. 5.**

In regard to FIG. 4, it will be observed that an overlap occurs in the video frequency spectrum between the Y and the I and Q signals. The 3.6 MHZ reference subcarrier was chosen to minimize interaction between the Y and the I and Q signals by producing an interleaved spectral distribution. A more detailed description of the encoder operation just described can be found in "Principles of Color Television" by Hazeltine Lab Staff.

Figure 6:
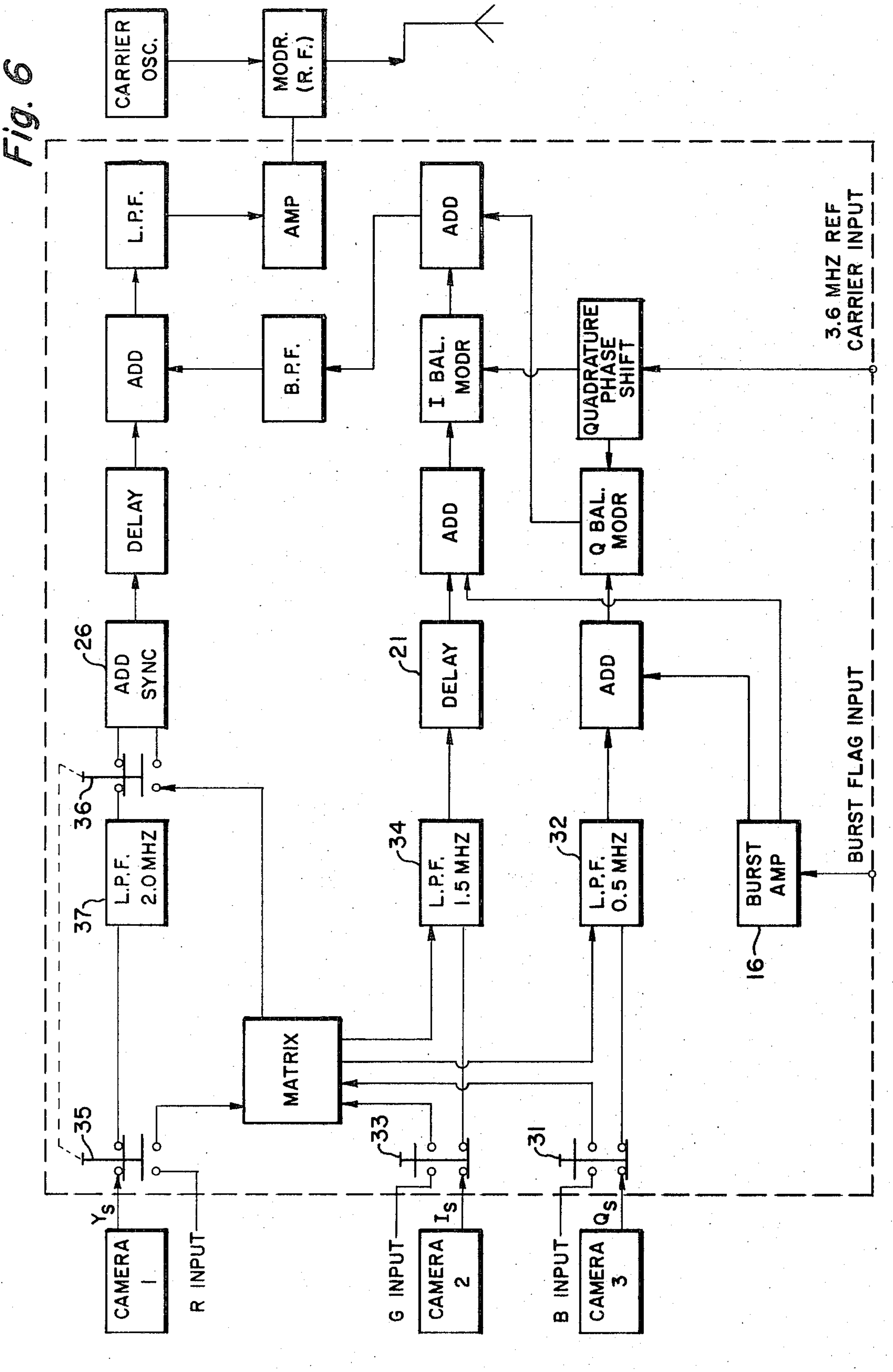
FIG. 6 illustrates a block diagram of an encoder similar to the encoder illustrated in FIG. 1 but modified to form a modulated composite signal from three independent video signal inputs, $Y_S$, $I_S$ and $Q_S$.

When completely independent monochrome pictures are desired, for example, for an educational TV branch system, such monochrome video signals from three separate TV cameras are fed into three inputs which bypass the matrixing circuitry 11. For the purpose of clarity, as shown in FIG. 6, the video signals povided by cameras 1, 2 and 3, are denoted as $Y_S$, $I_S$ and $Q_S$, respectively. The $Q_S$ signal instead of passing through the matrix circuitry bypasses it by the use of switch 31 so that the Q signal is applied directly to a 0.5 MHZ low-pass filter 32 and added with the signal from the burst pulse amplifier 16 in the manner as previously described with respect to FIG. 1. The $I_S$ signal from camera 2 bypasses the matrix circuitry 11 by use of switch 33 and passes directly through a 1.5 MHZ low-pass filter 34 from where the $I_S$ signal is received in the delay circuit 31 and continues in the manner already described with respect to FIG. 1.

Switches 35 and 36 in the $Y_S$ signal path from camera 1 provide a bypass of the matrix circuitry 11. These switches, when arranged as shown in FIG. 6, direct the $Y_S$ signal through a 2.0 MHZ low-pass filter from where the resultant $Y_S$ signal passes into the sync adder 26 and thence continues in the manner previously described with respect to FIG. 1. As just described with respect to FIG. 6, by suitably modifying the encoder illustrated therein through the use of the switches 31, 33, 35, 36 and the 2.0 MHZ low-pass filter 37, the encoder is restructured to produce a composite signal from the three independent video inputs $Y_S$, $I_S$ and $Q_S$ which can be separated out by a receiver to be described hereinafter, to give the original independent video signals. For conventional color transmission purposes, the encoder function illustrated in FIG. 6 is structured in the usual manner by throwing the aforementioned switches to their interconnecting relation with the matrix circuitry 11.

Figure 7:
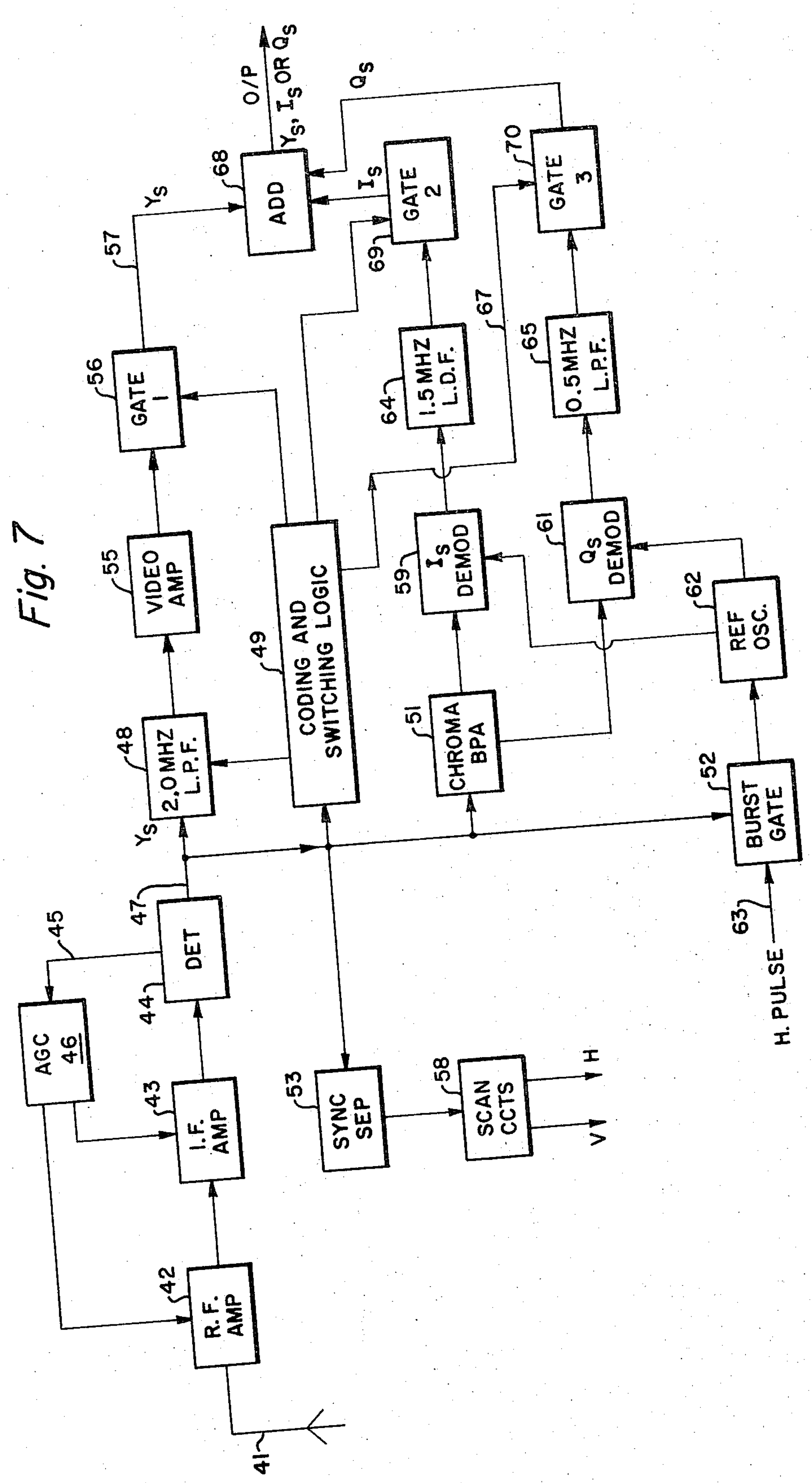
FIG. 7 illustrates a block diagram of a decoder in a receiver, according to the present invention, for demodulating the composite signal provided by the encoder illustrated in FIG. 6.
Figure 9:
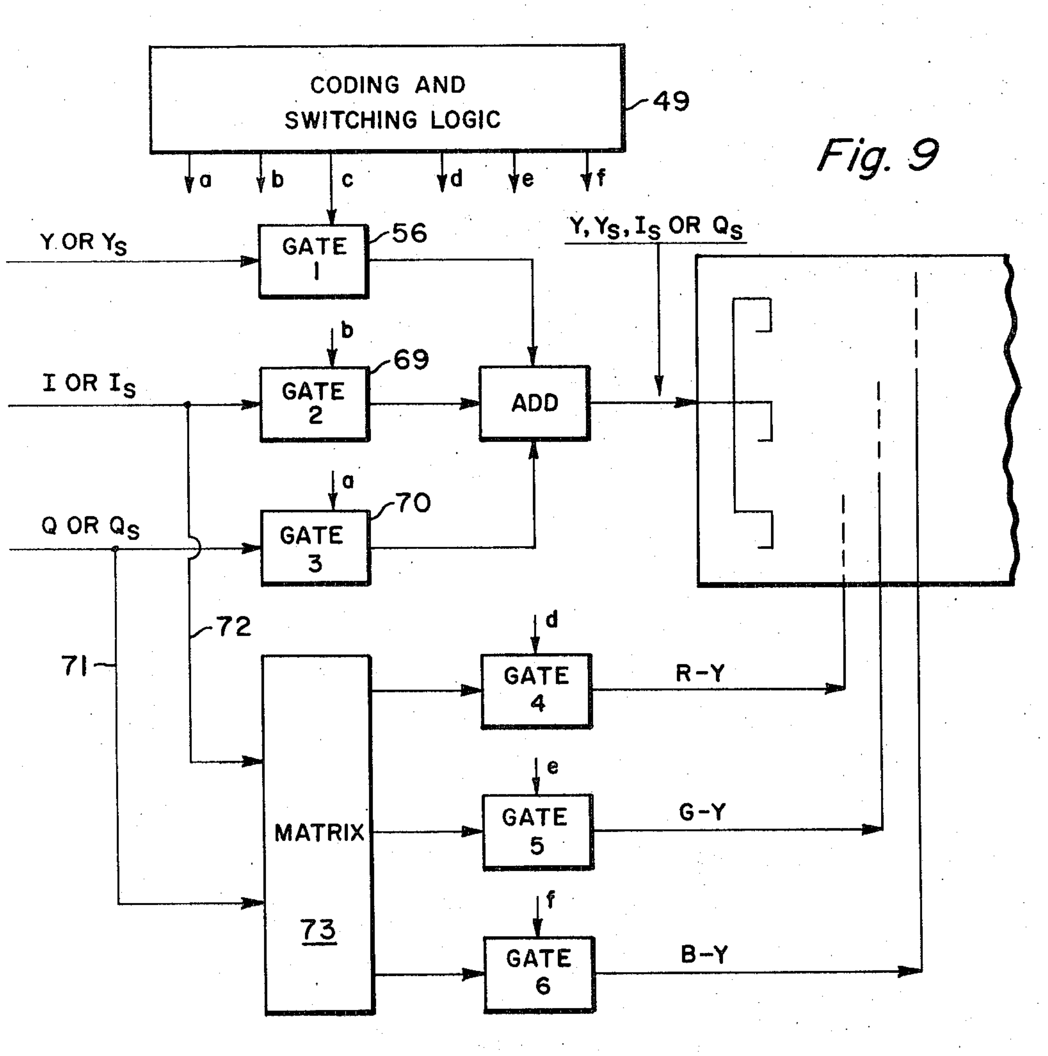
FIG. 9 is a block diagram illustrating in greater detail the operation of the coding and switching logic system shown in FIG. 7.

The block diagrams of FIGS. 7 and 9 illustrate the receiver for decoding the composite signal from the three independent picture signals $Y_S$, $I_S$ and $Q_S$, as well as the conventional color signals Y, I and Q. In the receiver, the antenna 41 provides a signal to an RF amplifier 42 whose output is connected to an IF amplifier 43. The amplifier 43 is connected to a detector 44 which provides a signal in line 45 connected to an automatic gain control amplifier 46 whose output is connected to the amplifiers 42 and 43 in accordance with the usual practice. The detector 44 provides an output signal in line 47 which is applied to a 2.0 MHZ low-pass filter 48, a coding and switching logic circuitry 49, a chroma bandpass amplifier 51, a burst gate 52 and a sync separator 53.

The signal from the 2.0 MHZ low-pass filter 48 passes through a video amplifier 55 and into a gate No. 1 which, when in its open position as determined by the coding and switching logic circuitry 49, produces a $Y_S$ signal in line 57. The signal from the detector 44 in line 47 passes into the sync separator 53 which is, in turn, delivered to a scan control circuit 58 for providing horizontal and vertical scan deflection signals. The signal from the chroma bandpass amplifier 51 is delivered to an $I_S$ demodulator 59 and a $Q_S$ demodulator 61. Each of these demodulators receives a signal from 3.6 MHZ reference oscillator 62 connected to the burst gate amplifier 52 that also has a burst input pulse delivered by line 63. The demodulated $I_S$ and $Q_S$ signals pass from the demodulators 59 and 61 to a 1.5 MHZ low-pass filter 64 and an 0.5 MHZ low-pass filter 65, respectively. The $I_S$ signal and $Q_S$ signal from these filters are applied independently to the circuitry of a gate No. 2 and the circuitry of a gate No. 3. These gates are controlled by lines 66 and 67 from the coding and switching logic circuitry 49. Dependent upon the position of the gates 1,

2 and 3, the signals $Y_S$, $Q_S$ and $I_S$ are delivered to an adder 68.

The $Y_S$ signal is separated from the frequency domain of the $I_S$ and $Q_S$ signals through the use of the 2.0 MHZ low-pass filter 48. In order to assure separation of the $Y_S$ signal and the $I_S$ and $Q_S$ signals, bandpass filters are included in the $I_S$ and $Q_S$ signal branch lines. As illustrated in FIG. 7, the $I_S$ and $Q_S$ signals are synchronously detected by the quadrature phased carrier obtained from the reference oscillator and filtered through the low-pass filters 64 and 65. Due to the asymmetry of response of the $I_S$ channel in both the transmitter and the receiver, quadrature "crosstalk" will occur in the $Q_S$ signal unless the higher frequency components of the $I_S$ signal are removed from the $Q_S$ signal. This is achieved by arranging the low-pass filter to follow the Q demodulator with a cutoff frequency at approximately 0.5 MHZ.

Figure 8:
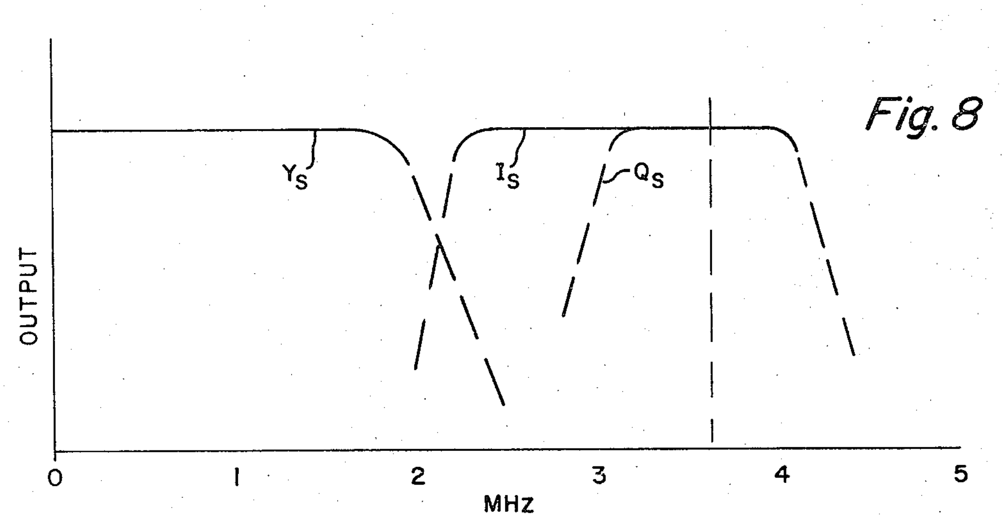
FIG. 8 illustrates the frequency responses of the $Y_S$, $I_S$ and $Q_S$ signal circuits illustrated in FIG. 7.

FIG. 8 illustrates the overall frequency responses of the $Y_S$ and the $I_S$ and $Q_S$ signals at the output of detector 44. In this regard, it will be noted that the $Y_S$ signal is limited to a frequency of approximately 2.0 MHZ.

FIG. 9 illustrates a block diagram of the operation of gates 1, 2 and 3, also three other gates Nos. 4, 5 and 6, by the coding and switching logic circuitry 49. In order to obtain color pictures, the conventional I and Q signals are inhibited by gates 2 and 3. These signals are also delivered by branch lines 71 and 72 to conventional matrix circuitry 73 for producing the standard chroma difference signals R-Y, G-Y and B-Y. These chroma difference signals are directed through gates 4, 5 and 6, respectively, from where they are connected to the separate control grids of a color cathode-ray tube. Gate 1 allows the Y signal to pass to the cathode of the cathode-ray tube where it is matrixed with the R-Y, B-Y and G-Y signals to obtain R, G and B signals. The coding and switching logic circuitry 49 receives command signals from selectors providing possible options of a standard color picture, a monochrome picture program No. 1, a monochrome picture program No. 2 and a monochrome picture program No. 3.

Any one of the $Y_S$, $I_S$ or $Q_S$ video signals can be selected and used to modulate the color CRT by appropriate selection of the monochrome picture selectors to produce such monochrome pictures on a color cathode-ray tube. When any one of the $Y_S$, $I_S$ or $Q_S$ signals is required, the coding and switching logic circuitry controls the gates 1–6 in a manner to allow the $Y_S$, $I_S$ or $Q_S$ signal to reach the cathode of the color CRT so that all three electron beams in the cathode-ray tube are controlled by the signals. The R-Y, B-Y and G-Y signals are prevented from reaching the grids of the CRT by gates 4, 5 and 6. Thus, for example, should the picture program No. 1 be desired, then gate 1 would be opened and gates 2–6 would be closed. A monochrome picture No. 2, corresponding to the $I_S$ signal, is selected by opening gate 2 and closing gates 1 and 3–6. The program corresponding to the $Q_S$ signal which is denoted by monochrome picture No. 3 is selected by opening gate 3 and closing gates 1, 2, 4, 5 and 6. When a color picture is required, the coding circuitry logic bypasses the 2.0 MHZ low-pass filter in the Y channel and operates gates 1–3 so that the Y signal only reaches the cathode of the color CRT. The coding circuitry logic also operates gates 4–6 to allow the R-Y, B-Y and G-Y signals to reach the grids of the color CRT. These chrominance signals are developed in the matrix circuitry in the usual manner by linear combinations of the I and Q signals which are received along lines 71 and 72.

Thus, in accordance with the present invention, a TV branching system is provided whereby picture selection may be made by a student or other operator through operation of the controls for the coding and switching logic circuitry. The audio carrier frequency remains available for use in the education process. Coded instructions from a transmitter may be used in conjunction with student response.

On the basis of what has been said herein, one skilled in the art will appreciate that any one of the $Y_S$, $I_S$ or $Q_S$ signals can be selected and used to modulate a monochrome CRT instead of a color CRT as specifically illustrated and described. If a monochrome CRT is used and a color signal is received, only the Y signal is used in the conventional manner to modulate the CRT and the 2.0 MHZ low-pass filter should be bypassed so as to make maximum use of the total bandwidth available.

Although the invention has been shown in connection with a certain specific embodiment, it will be readily apparent to those skilled in the art that various changes and arrangement of parts may be made to suit requirements without departing from the spirit and scope of the invention.

What is claimed is:

1. In television system for transmitting and receiving at least two separate and independent video signals using a single radio-frequency carrier signal, the combination of:

means for producing a complete first video signal corresponding to a first video image, a filter for limiting the upper frequency of said first video signal, means for producing a complete second video signal corresponding to a second video image, said second video signal being separate and independent from said first video signal, a filter for limiting the upper frequency of said second video signal, means for modulating the filtered second video signal onto a subcarrier to form a modulated subcarrier having a frequency domain essentially non-overlapping with the frequency domain of the filtered first video signal, means for combining the filtered first complete video signal and the filtered second complete video signal after modulation with a subcarrier to form a composite video signal, means for transmitting said composite signal on a single radio-frequency carrier signal, means for detecting the complete first video signal and the modulated subcarrier with the complete second video signal from said single radio-frequency carrier signal, means for demodulating the modulated subcarrier to recover the complete second video signal, and switching means for selecting one of the detected complete video signals for display of the video image represented thereby upon a cathode-ray tube of a television receiver.

2. The combination according to claim 1 further comprising means for producing three interdependent color video signals, matrixing means receiving said color video signals for delivering Y, I and Q video signals to said means for transmitting, switch means for removing said matrixing means from the signal paths of said first and second complete video signals, and switch means for removing said filter for said first video signal from the signal path of said color video signals.

3. The combination according to claim 2 further comprising means for decoding said Y, I and Q video signals, and means for connecting the decoded Y, I and Q signals to the red, green and blue control grids of a color cathode-ray tube.

4. The combination according to claim 3 wherein said filter for the complete first video signal comprises an approximate 2.0 MHZ low-pass filter, said combination further comprising switch means for passing said complete first video signal through said 2.0 MHZ low-pass filter.

5. The combination according to claim 4 further comprising an approximate 2.0 MHZ low-pass filter in the signal path of said complete first video signal following said means for detecting.

6. The combination according to claim 1 wherein said filter for the complete first video signal includes an approximately 2.0 MHZ low-pass filter.

7. The combination according to claim 6 further comprising means following said filter means in the signal path of said video signals for time synchronization thereof.

8. In a television system for transmitting and receiving three separate and independent video signals on a single radio-frequency carrier signal, the combination of:

means for producing a $Y_S$ video signal representing a complete and independent video image, means for producing an $I_S$ video signal representing a complete and independent video image, means for producing a $Q_S$ video signal representing a complete and independent video image, said $Y_S$, $Q_S$ and $I_S$ video signals being separate and independent from each other, a filter for limiting the upper frequency of said $Y_S$ video signal, filters for limiting the upper frequencies of said $I_S$ and $Q_S$ video signals, a quadrature-phased subcarrier for modulation by the filtered $I_S$ and $Q_S$ video signals to form a quadrature-phased modulated subcarrier having a frequency domain essentially non-overlapping with the frequency domain of the filtered $Y_S$ video signal, means for combining the filtered $Y_S$ video signal and the filtered $Q_S$ and $I_S$ video signals after modulation onto the quadrature-phased subcarrier to form a composite signal, means for transmitting said composite signal on a single radio-frequency carrier signal, means for detecting the $Y_S$ signal and the modulated quadrature-phased subcarrier from said single radio-frequency carrier signal, means for demodulating the $Q_S$ and $I_S$ video signals from said quadrature-phased subcarrier, and switching means for selecting one of the transmitted $Y_S$, $I_S$ and $Q_S$ video signals for display of the video image represented thereby upon a cathode-ray tube of a receiver.

9. The combination according to claim 8 further comprising a means for producing interdependent red, green and blue color video signals corresponding to video image, means for matrixing said red, green and blue video signals to form a luminance Y and chromance I and Q video signals, and switch means for removing said means for matrixing said red, green and blue video signals from the signal paths of said $Y_S$, $I_S$ and $Q_S$ video signals.

10. The combination according to claim 9 further comprising means for decoding said Y, I and Q video signals, switching means for connecting the decoded Y, I and Q video signals to the red, green and blue grids of a color cathode-ray tube of a receiver, and coding and switching logic means for controlling said switching means.

11. The combination according to claim 10 further comprising an approximate 2.0 MHZ filter in the $Y_S$ video signal path from said means for detecting.

12. The combination according to claim 8 wherein said filter for limiting the upper frequency of said $Y_S$ video signal includes an approximate 2.0 MHZ low-pass filter.

13. The combination according to claim 12 wherein said filter means for limiting the upper frequency of said $I_S$ and $Q_S$ video signals include an approximately 1.5 MHZ filter in the signal path of said $I_S$ video signal and an approximately 0.5 MHZ filter in the signal path of said $Q_S$ video signal.

14. The combination according to claim 13 further comprising synchronizing means in the signal paths of the filtered $Y_S$ and $I_S$ video signals preceding said means for combining.

15. The combination according to claim 8 wherein said $Y_S$, $I_S$ and $Q_S$ video signals are concurrent and separate monochrome video signals from three individual television cameras.

* * * * *